Patented Nov. 26, 1935

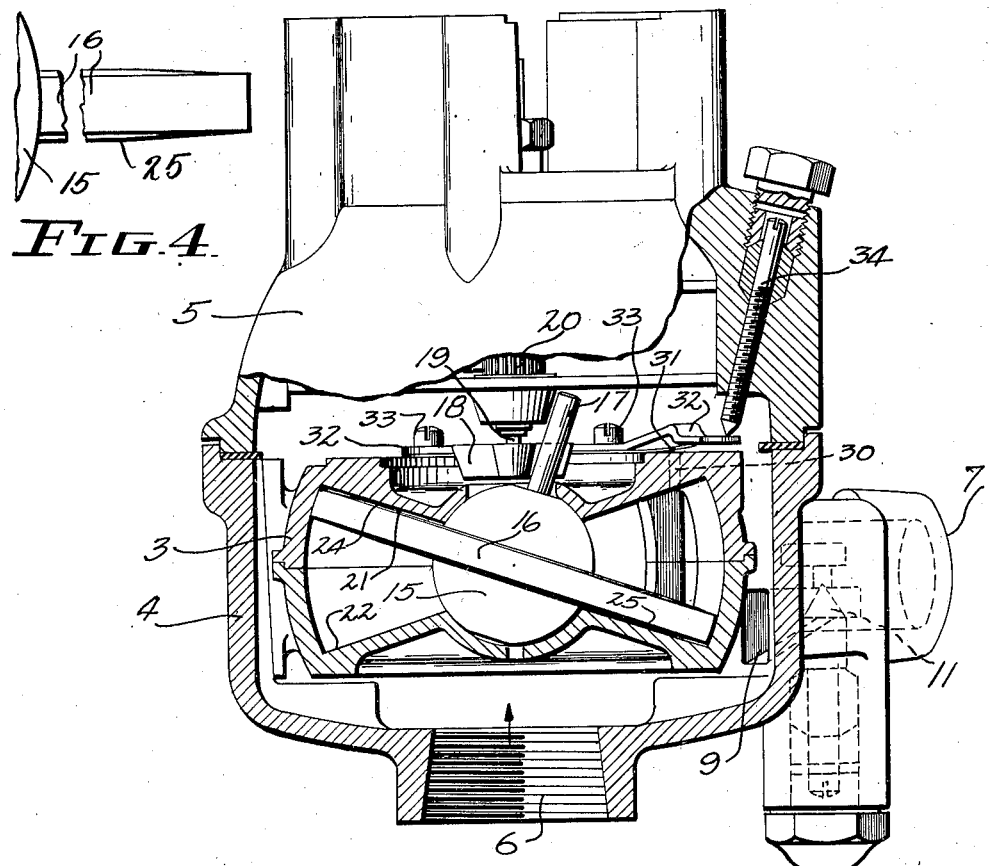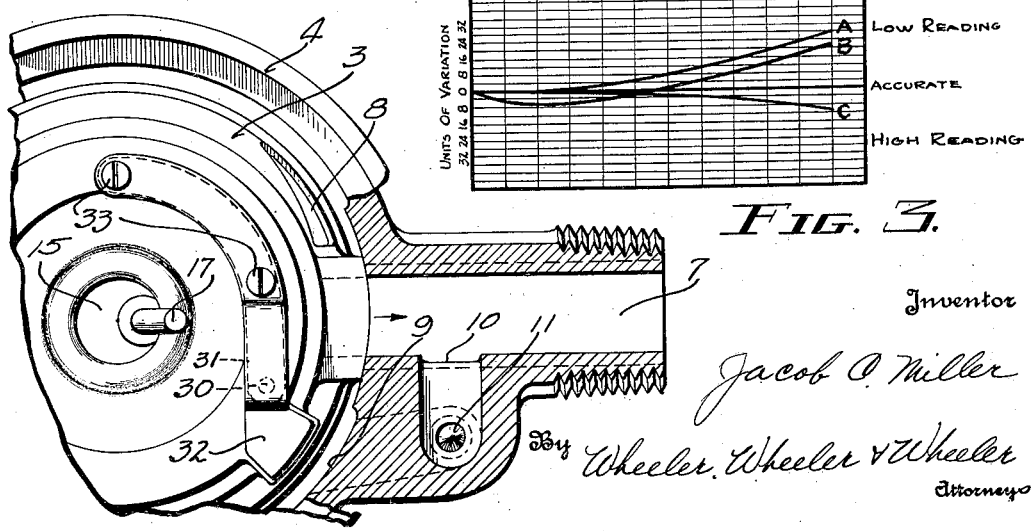

2,021,918

UNITED STATES PATENT OFFICE 2,021,918

FLUID METER

Jacob C. Miller, Milwaukee, Wis., assignor to Badger Meter Manufacturing Company, Milwaukee, Wis., a corporation of Wisconsin Application October 27, 1930, Serial No. 491,430

19 Claims. (Cl. 73—98)

This invention relates to improvements in meters.

It is the object of the invention to provide means for automatically compensating for irregularities in meter registration occasioned by changes in rates of flow through the meter. It is common practice to by-pass the fluid motor of a meter for purposes of calibration. Such a by-pass, however, and the more or less fixed frictional resistance of the motor and register gear train introduce variations from correct readings when the rate of flow through the meter changes. The variation has occurred in such a direction that the meter reading has invariably been too low when the meter is handling low volumes of fluid.

The present invention seeks to overcome the difficulties heretofore experienced in this regard; first, by changing the meter construction in order that, notwithstanding the main by-pass, the meter reading may be made to run progressively higher instead of lower in accordance with the decrease of volume of fluid passing through the meter. Having accomplished this fundamental change in the principle of the meter, I am able, by means of a special by-pass and automatic control means therefor, to allow increasing relative proportions of fluid to by-pass the motor portion of the meter at low rates of flow to the end that the actual flow will, under all circumstances within exceptionally wide limits, correspond exactly with the meter reading.

In the drawing:

Figure 1 is a view of a meter embodying this invention shown generally in vertical axial section and partially in side elevation.

Figure 2 is a fragmentary plane view of the motor chamber with the cover removed.

Figure 3 is a diagram or chart illustrating roughly the manner in which my improved construction accomplishes the purposes of the present invention.

Figure 4 is a fragmentary view of the disk in cross section on an enlarged scale illustrating in exaggerated form the contour of its face surfaces.

Like parts are identified by the same reference characters throughout the several views.

The motor chamber 3 is enclosed by a meter case 4 and a cover therefor at 5 having a fluid inlet 6 and a fluid outlet at 7. The fluid admitted at 6 will fill the interior of the case and find its way into the motor chamber 3 through the usual inlet port at 8. The outlet port of the motor chamber registers with outlet passage 7, as shown in Figure 2.

The usual by-pass duct opens at 9 from the case 4 and discharges at 10 into the outlet passage 7 of the meter. Flow therethrough is controlled by the needle valve 11.

The motor within case 3 is of the well known "wobble disk" type, but is of special construction. A spherical bearing member 15 is mounted in a complementary bearing portion of the meter chamber 3 and carries a disk 16 having a spherically contoured periphery. A spindle or peg 17, carried by the bearing member 15, describes an orbit in the operation of the meter and transmits motion to one of the wings 18 of shaft 19, which drives a train of gears, one unit of which appears at 20. In all respects thus far described, the construction is standard.

In meter manufacture heretofore it has been customary to make the disk 16 with upper and lower plane surfaces contacting with upper and lower plane surfaces 21 and 22 of the meter chamber. Since the disk 16 and its bearing member 15 are secured against rotation by the usual means and since the disk 16 can obviously have only a linear contact with the surfaces 21 and 22 which shifts during the movement of the disk, it will at first appear that the movement of the disk within its chamber is a virtually frictionless rolling movement.

It will be noted, however, that the actual diameter of the disk 16 is materially greater than the diameter of the outer margin of either of the surfaces 21 or 22 so that if the disk is given its usual orbital movement without being restrained as to rotation, it will slowly turn upon its axis in consequence of the orbital movement referred to. This turning movement is due to the rolling of the relatively larger diameter of the disk about the relatively smaller diameter of its chamber. Thus, when the disk is restrained against rotation as in ordinary meter operation, there is a constant slippage of the disk with respect to its chamber, and I believe that a very material portion of the friction in an ordinary meter is attributable to this slippage.

I believe, moreover, that a considerable part of the meter error during low meter speeds is attributable to this friction, since, when the volume of fluid passing through the meter is low, the friction remaining more or less constant, the ratio of friction to volume of fluid will be increased and the tendency of the fluid to go through by-pass port 9 will also be increased. Whatever the reason, the fact is that in previously existing meters, there has been a persistent and invariable tendency to give low readings at low rates of flow.

In meters for handling gasoline and other light fluids of like nature, the usual requirement is to maintain reasonable accuracy over a range extending from fifteen gallons per minute to eight gallons per minute. By a meter designed for over-reading corrected by a by-pass, meter curves have been changed from that shown at A to that shown at B. In other words, instead of being entirely too low as to reading, meters have been made which over a part of the range read too high and over another part of the range read too low, but which, throughout the specified range, would remain within the limits of error regarded as permissible.

Believing that this situation was attributable in large part to friction between the disk 16 and the meter chamber surfaces 21 and 22, I attempted to reduce the effect of such friction in retarding the meter register, and to that end I so modified the form of the disk 16 that instead of making a linear contact with surfaces 21 and 22, it makes only a point contact therewith, the point being remote from its periphery. In order to accomplish this result, I first reduced the thickness of disk 16, throughout its extent, by about 5/1000's of an inch in a 3¼ inch disk, with the surfaces 21 and 22 remaining as before. The result was to make the disk contact such surfaces only at the periphery of the disk. I then reduced the thickness of the periphery of the disk by about a 3/1000 of an inch additional, commencing at a point about midway between the spherical bearing 15 and the periphery of the disk. Thus, the disk is made to taper in all directions radially toward its periphery from an intermediate circle intersecting its upper and lower surfaces. This taper toward the periphery makes the periphery of the disk clear the surfaces 21 and 22, and instead of a radial line of contact with such surfaces, the disk now touches these surfaces only at the points 24 and 25.

It will be understood that any arrangement providing relative convexity between each face surface of disk 16 and the complementary conical surface of the casing will be satisfactory, but for economy of manufacture I prefer that the surfaces of disk 16 be made convex. Tests made with a meter so modified showed results indicated by curve C in Figure 3, the meter reading being consistently higher as the rate of flow decreased. I attribute this result to the fact that the location of frictional engagement of the disk with the meter chamber was reduced in extent and moved centrally, whereby the fluid acting on the disk had increased mechanical advantage over the resistance offered by the friction. Whether this theory is correct or not, the result was as shown at C in Figure 3.

It is exceptionally important to observe that within the range of flow from 8 to 15 gallons per minute, all points of curve C are within the permissible limits of error as judged by present commercial standards. Therefore, this feature alone represents a sufficient solution of the problem for practical purposes. Having gone thus far, however, I found that it was possible to make the meter substantially perfectly accurate so that its performance curve would correspond almost identically with the line marked "accurate" in Figure 3.

Having a meter in which the reading was increasingly high at low rates of flow, it was possible to use a secondary by-pass as a means of compensating for the error. To bring about this result I provide a by-pass port or duct at 30 across which extends a light upwardly curving flat spring 31. This spring is held in place and adjusted by means of a very much heavier spring plate 32 screwed to the meter chamber at 33. A set screw 34, adjustable through a boss of the cover member 5, bears on the outer end of the control plate 32 and serves to adjust it downwardly against its own tension to limit the extent to which the curvature of the light spring 31 tends to cause such light spring to rise away from the port 30.

At high rates of flow the volume of water passing through the meter is such that the pressure of such fluid holds the spring valve 31 tightly across port 30, thus permitting no fluid to escape through port 30 from the meter casing to the outlet side of the motor chamber. As flow through the meter decreases, the pressure in the meter casing is gradually relieved and the spring 31 will slowly curve upwardly toward the position in which it appears in Figure 1. The ultimate extent to which the spring 31 will open port 30 is determined by the setting of set screw 34 and the consequent position of the spring plate 32, which acts as a stop for the spring valve 31.

As the flat spring 31 moves to and from its closed position with reference to the port or ducts 30 a greater or less portion of the length of such spring will lie in face contact with the top wall of the meter chamber. The effect of this phenomenon in varying the bias of the spring is of much more importance to the result than is the particular weight of spring stock or the particular upward curvature given to the spring. Therefore, while the character of the stock and the degree of initial upward curvature are important to the result, they are not at all critical, and it is easily possible to ascertain the desired characteristics for any given installation by checking a number of different springs against a chart of the results of a flow test in any given meter. When the approximate characteristics of the spring are determined, the spring may readily be calibrated to the particular meter by means of the adjusting screw 34 which fixes the degree of initial curvature and bias.

In this manner, it is readily possible to produce and adjust a valve comprising spring 31 to compensate fully for the error represented by such a curve as that shown at C so that throughout much greater ranges of flow than those heretofore regarded as practicable, exact accuracy may be obtained and an exact correspondence achieved between the meter reading and the amount of fluid actually passing through the meter.

I claim:

1. In a meter, a fluid motor of the disk type including a motor chamber and a disk having complementary face surfaces relatively convex in a radial direction and adapted for point contact only about a line intermediate the center and the periphery of the disk.

2. In a meter, an operating motor comprising a motor chamber and a motor disk having complementary face surfaces of such dimensions and disposition as to be non-engageable with each other in their outermost areas.

3. In a meter, an actuating motor comprising a chamber having opposed co-axial substantially conical surfaces converging centrally and having their opposite sides relative to the common axis thereof disposed respectively upon extensions of parallel lines mutually spaced for a predetermined distance, and a disk operating in said chamber of which all portions are thinner than said distance, and of which a portion of the surface thereof is displaced from the projection of another portion of said surface whereby said disk in its nutating movement in said chamber is adapted for point contact with said surfaces only.

4. In a meter, an actuating motor comprising a chamber having opposed substantially conical surfaces converging centrally and having their respective opposite sides disposed upon extensions of parallel lines mutually spaced for a predetermined distance, and a disk operating in said chamber of which all portions are thinner than said distance, and of which a portion of the surface thereof is displaced from the projection of another portion of said surface whereby said disk in its nutating movement in said chamber is adapted for point contact with said surfaces only, and the point of displacement of said surface of said disk being so chosen that the point of contact with said surfaces will be materially spaced centrally from the periphery of the disk.

5. In a meter, the combination with motor means, a motor chamber enclosing said means and having an inlet and an outlet, said meter being arranged to provide a by-pass duct around said motor means, of a spring valve plate associated with said duct in a position to regulate flow therethrough, said plate being resiliently yieldable in a flow restricting direction in accordance with an increase in the pressure differential of fluid thereon and being biased to oppose such yielding.

6. In a meter, the combination with motor means, a motor chamber enclosing said means and having an inlet and an outlet, said meter being arranged to provide a by-pass duct around said motor means, of a spring valve plate associated with said duct in a position to regulate flow therethrough, said plate being resiliently yieldable in accordance with the pressure of fluid thereon, a guard plate for said first mentioned plate comprising a stop, and means for regulating the position of said guard plate.

7. In a meter, the combination with a fluid operated motor adapted to increase its proportionate rate of response in accordance with a decrease of rate of flow therethrough, of a means associated with the meter structure defining by-pass duct about said motor and a fluid operable valve controlling said by-pass and arranged to close in the direction in which said valve is actuated by the pressure differential across it, said valve being spring urged to open position and arranged to close progressively in accordance with increases in said pressure differential.

8. In a meter, the combination with a fluid motor showing an increasing ratio of response in accordance with decrease in the rate of flow therethrough, of means incorporated in the meter structure defining a by-pass duct about said motor and a valve seating in the direction of the inlet of said duct and including spring means opposing its seating.

9. In a meter, the combination with a fluid motor adapted to increase the ratio of its response in accordance with a decrease in rate of flow therethrough, of means providing a by-pass duct around said motor, a normally curved spring valve plate adapted when distorted under pressure to seat across the inlet of said by-pass, and stop means defining an initial position of said plate.

10. In a meter, the combination with a motor chamber and disk having complementary relatively convex face surfaces adapted for a point contact in the orbital movement of the disk intermediate their radial extent, of means providing a by-pass duct around said disk, and a fluid operable valve controlling the discharge through said duct.

11. In a meter, the combination with a motor chamber having opposed conical surfaces, of a disk mounted for wobble movement between said surfaces, said disk being thinner than the distance between projected radial lines from opposite sides of the respective surfaces, and tapered in all directions toward its periphery, a portion of the surface of said disk being displaced from the projection of the surface of the remainder of the disk whereby to be adapted for point contact only with respect to said surfaces, and means providing a by-pass duct about said disk and a spring supported valve exposed to fluid pressure at the inlet side of said disk and yieldable in accordance with said pressure to control flow through said by-pass.

12. A meter comprising a casing having an inlet and outlet, a by-pass duct and a valve for controlling said duct, in combination with a meter chamber having an inlet communicating with the interior of said casing and an outlet communicating with the outlet from said casing, a motor disk within said chamber having the outer peripheral portions of its face surfaces relieved, as compared with the thickness of the central portions of said disk whereby to reduce frictional contact of said surface portions with said chamber, and means providing a by-pass duct about said disk, and a fluid operable valve controlling the escape of fluid through said last mentioned duct.

13. A meter comprising a casing having an inlet and outlet, a by-pass duct and a valve for controlling said duct, in combination with a motor chamber having an inlet communicating with the interior of said casing and an outlet communicating with the outlet from said casing, a motor disk within said chamber having the outer peripheral portions of its face surfaces relieved, whereby to reduce frictional contact of said surface portions with said chamber, and means providing a by-pass duct about said disk, and a fluid operable valve controlling the escape of fluid through said last mentioned duct, said duct having an inlet port, a valve seat portion surrounding said port, said valve comprising a curved spring plate mounted on said chamber and exposed to pressures within said casing, said spring plate extending across said inlet to said duct and progressively receding therefrom whereby to close more and more the passage through said port as said spring is gradually forced into contact with said seat under increasing pressure.

14. A meter comprising a casing having an inlet and outlet, a by-pass duct and a valve for controlling said duct, in combination with a motor chamber having an inlet communicating with the interior of said casing and an outlet communicating with the outlet from said casing, a motor disk within said chamber having the outer peripheral portions of its face surfaces relieved, whereby to reduce frictional contact of said surface portions with said chamber, and means providing a by-pass duct about said disk, and a fluid operable valve controlling the escape of fluid through said last mentioned duct, said valve comprising a curved spring plate mounted on said chamber and exposed to pressures within said casing and extending across the inlet to said duct, said casing including an adjustable means determinative of the initial position of said plate.

15. In a meter, the combination with a casing and a fluid-operated over-registering motor therein, of a by-pass across said motor having a capacity sufficient to supply an excess of fluid equal to the amount of over-registration of the motor, said by-pass having an inlet port, a valve seat portion surrounding said port, and a valve regulating the flow through said by-pass and comprising a spring plate in the path of such flow and curving away from said seat to vary the rate of flow in accordance with the flattening of the plate against said seat, the curvature of said plate offering a variable resistance to the flattening thereof predetermined to compensate for pressure induced changes in flow through said by-pass.

16. In a meter, the combination with a casing providing a motor chamber, a by-pass port, and a valve seat portion about said port, of an over-registering fluid motor in said chamber, the capacity of said port being sufficient to compensate for the over-registration of said motor, and a valve regulating flow through said port and comprising a plate connected at one end to said casing and curving away from its point of connection and across said port, whereby to be disposed at the path of fluid entering said port and to close said port and obstruct such fluid progressively as said plate is progressively flattened against said seat by the pressure differential across it, the curve of said plate being calculated to offer a progressively increasing resistance to the flattening as portions thereof are supported by contact with said seat compensatory for the error in by-pass compensation.

17. In a meter the combination with a fluid operated motor adapted to increase its proportionate rate of response in accordance with a decrease of rate of flow therethrough, of means associated with the meter structure defining a by-pass duct about said motor and having an inlet port, a fluid operable valve controlling said by-pass and comprising a spring plate extending across said inlet port and curving away from said port whereby to be straightened across said port in proportion to the differential pressure actuating said motor, said valve closing said port more and more as said differential increases.

18. In a meter the combination with a fluid operated motor adapted to increase its proportionate rate of response in accordance with a decrease of rate of flow therethrough, of means associated with the meter structure defining a by-pass duct about said motor and having an inlet port, and a fluid operable valve controlling said by-pass, said valve being removed from said port, but disposed in position to be urged toward said port by fluid entering said port, said valve having a spring bias away from said port calculated to increase as said valve approaches said port and to decrease as said valve moves from said port, whereby changes in pressure differential may cause movement of said valve toward and from said port in amounts corresponding to said changes in pressure differential.

19. In a meter, the combination with metering mechanism comprising an over-registering motor, a wall containing a by-pass port, and a fluid operable valve controlling said port and comprising a curvilinear spring plate biased to deviate arcuately from said wall and extending across said port, to be progressively forced in contact with said wall to effect an increasing closure of said port in accordance with an increase in pressure differential across said valve.

JACOB C. MILLER.